United States Patent
Goguen et al.

(10) Patent No.: US 8,119,712 B2
(45) Date of Patent: Feb. 21, 2012

(54) GOLF BALLS HAVING LAYERS MADE FROM RUBBER COMPOSITIONS CONTAINING NUCLEATING AGENTS

(75) Inventors: Douglas S. Goguen, New Bedford, MA (US); Brian Comeau, Berkley, MA (US); David A. Bulpett, Boston, MA (US)

(73) Assignee: Acushnet Company, Fairhaven, MA (US)

( * ) Notice: Subject to any disclaimer, the term of this patent is extended or adjusted under 35 U.S.C. 154(b) by 398 days.

(21) Appl. No.: 12/501,062

(22) Filed: Jul. 10, 2009

(65) Prior Publication Data

US 2011/0009212 A1    Jan. 13, 2011

(51) Int. Cl.
*A63B 37/06* (2006.01)
*A63B 37/00* (2006.01)
*C08L 9/00* (2006.01)

(52) U.S. Cl. ........ 524/226; 524/227; 524/228; 524/229; 473/371; 473/372; 473/373; 473/374; 473/377

(58) Field of Classification Search ........................ None
See application file for complete search history.

(56) References Cited

U.S. PATENT DOCUMENTS

| | | | |
|---|---|---|---|
| 4,483,949 A | 11/1984 | Semen et al. | |
| 5,362,782 A | 11/1994 | McCullough, Jr. et al. | |
| 5,674,630 A | 10/1997 | Chatterjee | |
| 5,948,839 A | 9/1999 | Chatterjee | |
| 6,767,940 B2 * | 7/2004 | Voorheis et al. | 524/89 |
| 7,235,191 B2 | 6/2007 | Schmidt et al. | |
| 7,479,515 B2 | 1/2009 | Schmidt et al. | |
| 2006/0014903 A1 | 1/2006 | Vromman | |
| 2006/0063887 A1 | 3/2006 | Kang et al. | |
| 2007/0197712 A1 | 8/2007 | Fujiwara | |

OTHER PUBLICATIONS

Blomenhofer et al., "Designer" Nucleating Agents for Polypropylene, Macromolecules, vol. 38, No. 9, 2005.

* cited by examiner

*Primary Examiner* — David Buttner
(74) *Attorney, Agent, or Firm* — Daniel W. Sullivan

(57) ABSTRACT

Golf balls containing at least one layer made from a rubber composition comprising a benzenetrisamide nucleating agent are provided. The rubber composition preferably contains a free-radical initiator agent, cross-linking agent, and fillers along with the base rubber and nucleating agent. Golf balls of various constructions may be made including two-piece, three-piece, and four-piece balls. The composition is used preferably to form a golf ball core having improved resiliency, durability, toughness, and impact strength.

14 Claims, 3 Drawing Sheets

GOLF BALLS HAVING LAYERS MADE FROM RUBBER COMPOSITIONS CONTAINING NUCLEATING AGENTS

BACKGROUND OF THE INVENTION

1. Field of the Invention

The present invention relates generally to golf balls containing at least one layer made from a rubber composition comprising a nucleating agent. More particularly, the nucleating agent is a benzenetrisamide compound. The composition may be used to form any layer in the golf ball structure such as, for example, a core, intermediate layer, and/or cover. Preferably, the composition is used to form a core having improved resiliency and other physical properties.

2. Brief Review of the Related Art

Nucleating agents are commonly added to crystallizable thermoplastics, such as polyoelfins, to make products used in various industrial applications. The nucleating agent provides nucleating sites for the thermoplastic material to crystallize from the melt. In this manner, the nucleating agents help control the crystallization rate, crystal size, and other crystalline properties of the material. Films, sheets, molded parts, and other products having improved chemical and physical properties may be made from the crystallizable material. For example, nucleating agents may be added to a crystallizable polypropylene resin to make a film. The stiffness, surface hardness, and scratch-resistant properties of the resulting polypropylene films may be increased.

McCullough, Jr, et al., U.S. Pat. No. 5,362,782 discloses polypropylene impact copolymer compositions containing a nucleating agent such as 50 to 2000 ppm sodium benzoate. This increases the stiffness and notched Izod impact strength of the composition making it useful in the production of molded and extruded articles, shaped containers, and films having good clarity.

Chatterjee, U.S. Pat. No. 5,674,630 discloses polypropylene impact copolymer compositions containing a homopolymer phase of predominantly homopolymeric polypropylene, a copolymer phase of copolymerized ethylene and propylene, and a nucleating agent. The compositions have a rubber content (Fc) in the range of 25 to 45% by weight, a crystallization temperature in the range of 122° to 132° C., a melt flow in the range of about 7 to about 60 dg/min, and a ratio of the intrinsic viscosity of the copolymer phase to the intrinsic viscosity of the homopolymer phase of 1.4 to about 1.9. The polypropylene impact copolymer compositions may be used to form cast films.

In recent years, multi-piece solid golf balls have become more popular for several reasons, including, ease of manufacturing, material costs, ball properties, and ball playing performance. Basically, a two-piece solid golf ball includes a solid inner core protected by an outer cover. The inner core is made commonly of a rubber material such as natural and synthetic rubbers, styrene butadiene, polybutadiene, poly(cis-isoprene), or poly(trans-isoprene). The outer cover is made commonly of a thermoplastic such as ionomer resins, polyamides or polyesters; and thermoplastic and thermoset polyurethane and polyurea elastomers. Referring to FIG. 1, a golf ball (10) having a conventional two-piece design is shown. The ball (10) includes an inner core (12) and outer cover (14). As new materials and manufacturing processes have become available, three-piece and four-piece solid golf balls have been introduced. Different materials can be used to impart specific properties and features to the ball. For example, FIG. 2 shows a conventional three-piece golf ball (20) having an inner core (22), at least one intermediate layer (24) surrounding the core, and an outer cover (26). The intermediate layer (24) may serve as a water vapor barrier to prevent moisture from penetrating into the underlying core (22). In other instances, a four-piece solid golf ball (30) having an inner core (31) and surrounding core layer (32), as shown in FIG. 3, is made. The ball (30) further includes an intermediate layer (34) and outer cover (36).

The core is the primary source of resiliency for the golf ball and is often referred to as the "engine" of the ball. The resiliency or coefficient of restitution ("COR") of a golf ball (or golf ball sub-component such as a core) means the ratio of a ball's rebound velocity to its initial incoming velocity when the ball is fired out of an air cannon into a rigid plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls (or cores) with a higher rebound velocity have a higher COR value. Such golf balls rebound faster, retain more total energy when struck with a club, and have longer flight distance. In general, the COR of the ball will increase as the hardness of the ball is increased. The test methods for measuring the COR are described in further detail below. In some conventional golf balls, materials are used to increase the hardness of the core so that the resiliency of the core is increased, and this, in turn, causes the compression of the core to increase.

In general, compression refers to the deflection that a golf ball (or golf ball component such as a core) undergoes when subjected to a compressive load. Several different methods may be used to measure compression of the golf ball and its components. The compression is commonly measured using Atti or Riehle compression gauges. In the Atti method, as described further below, a piston is used to compress a ball against a spring. The travel distance and load of the piston are fixed and the deflection of the spring is measured. If the core is relatively soft, the spring will deflect only by a minimal amount. On the other hand, if the core is relatively hard, the spring will deflect a significant amount. The test methods for measuring compression are described in further detail below.

Cores having a higher compression are harder and tend to have good durability, toughness, and impact strength as well as resiliency. Players may achieve greater flight distance when using such golf balls, which is particularly desirable when hitting the ball off the tee. However, high compression balls are relatively stiff and this may have a detrimental effect. Players tend to experience a harder "feel" when their club face makes contact with such golf balls. The player senses less control, and the harder ball tends to have low initial spin. The sensation of striking the ball is generally less natural and comfortable with "hard" golf balls versus "soft" golf balls. With a golf ball having a softer feel, the player can place a spin on the ball and better control its flight pattern. The softer golf ball feels more natural. The player senses more control, and the softer ball tends to have high initial spin. This is particularly desirable when making approach shots near a golf hole green. Skilled players can place a back-spin on such balls so that they land precisely on the green.

It would be desirable to develop a core material that provides enhanced resiliency along with a soft feel to the golf ball. The core material should have good durability, toughness, and impact strength. The core material should have high resiliency and COR so that a player can drive the ball long distances. The core material, however, should not be so stiff that playing performance properties such as feel, softness, and spin control are sacrificed. One objective of the present invention is to develop a core material having an optimum combination of hard and soft properties. Improved resiliency, durability, toughness, and impact strength are some desirable hard properties, while a better feel and spin control are some desirable soft properties. The present invention provides a core material and the resulting golf ball having these properties as well as other advantageous features and characteristics.

SUMMARY OF THE INVENTION

The present invention provides golf balls comprising a core and cover. The core is made of a rubber composition containing a base rubber and nucleating agent. The base rubber may be selected from the group consisting of polybutadiene, polyisoprene, natural rubber, a copolymer of ethylene/propylene rubber, a copolymer of ethylene/propylene diene rubber, a copolymer of styrene/butadiene rubber, and mixtures thereof. The nucleating agent is a benzenetrisamide and is present in the amount of 0.1 to 5 parts by weight per 100 parts of the base rubber. The resulting golf ball has improved physical properties. Particularly, the core has a COR value in the range of about 0.60 to about 0.85 and a compression in the range of about 60 to about 90.

The golf ball may include cross-linking agents and co-agents such as, for example, zinc acrylate, zinc diacrylate, zinc methacrylate, and zinc dimethacrylate, trimethylolpropane trimethacrylate, and mixtures thereof. Peroxide free-radical initiators and sulfur-based curing agents may be added to the composition. Halogenated organosulfur compounds such as zinc pentachlorothiophenol also may be added. The resulting golf ball tends to have sufficient hardness so that it has good resiliency as well as, durability, toughness, and impact strength. At the same time, however, the ball tends to have sufficient softness so that it has a soft feel and good spin control.

Golf balls made in accordance with this invention may have various constructions. For example, a two-piece solid golf ball having an inner core made of the rubber composition and an outer cover may be made. A three-piece golf ball having an intermediate layer disposed between the core and cover, and a four-piece ball having an inner core and outer core layer also may be made. Generally, the core has a surface hardness in the range of about 30 to about 65 Shore D; the cover has a material hardness in the range of about 30 to about 65 Shore D; and the intermediate layer has a material hardness in the range of about 30 to about 75 Shore D. Preferably, the rubber composition is used in a core. In other versions, the rubber composition may be used in an intermediate layer, and/or cover, which may be single or multi-layered.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE PREFERRED EMBODIMENTS

Figure 1:
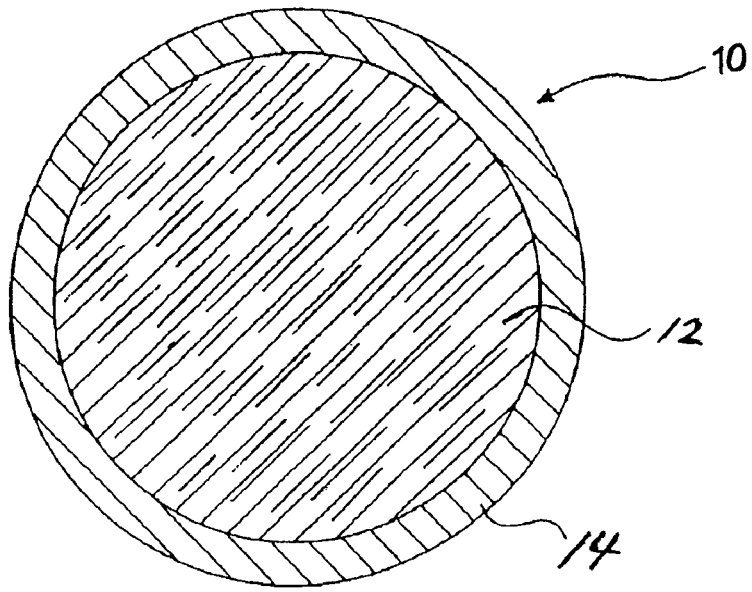
FIG. 1 is a cross-sectional view of a prior art, two-piece golf ball.
Figure 2:
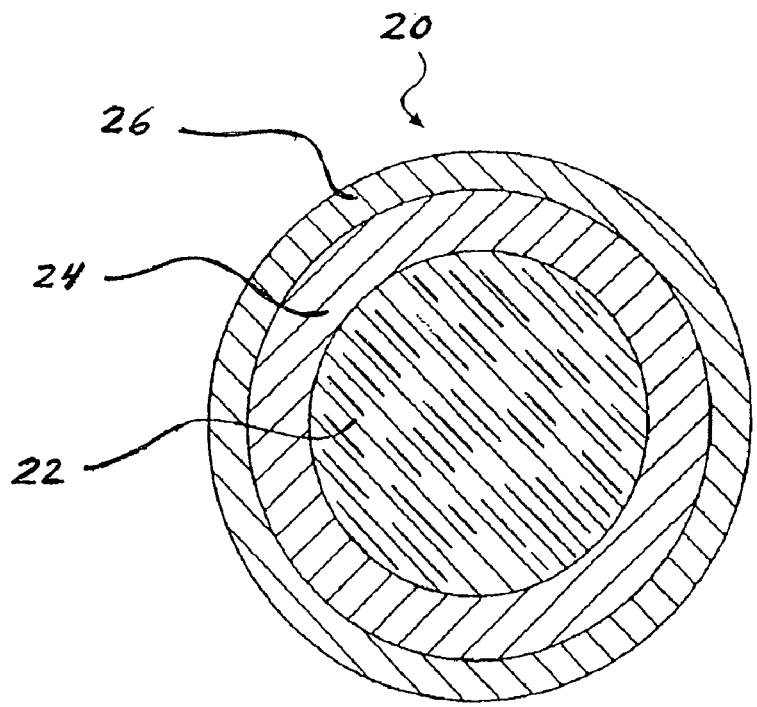
FIG. 2 is a cross-sectional view of a prior art, three-piece golf ball.
Figure 3:
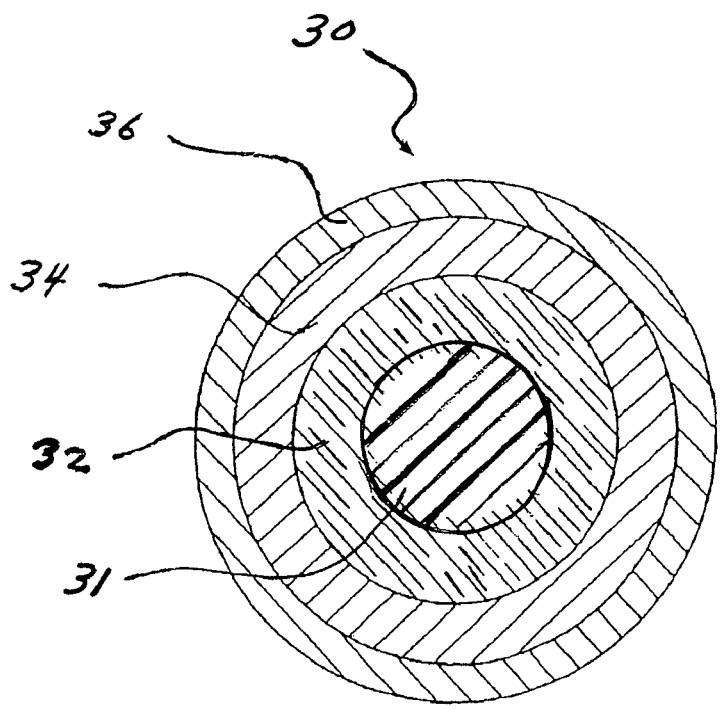
FIG. 3 is a cross-sectional view of a prior art, four-piece golf ball containing a two-piece core.

The present invention relates to golf balls having a core material made from a rubber composition comprising a base rubber and nucleating agent, particularly a benzenetrisamide as defined further below. The rubber composition of this invention preferably contains a free-radical initiator agent, cross-linking agent, and fillers along with the base rubber and benzenetrisamide nucleating agent.

The base rubber may be selected from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers selected from polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, metallocene-catalyzed elastomers, and plastomers. When the rubber composition contains an additional elastomer (in addition to the base rubber), the additional elastomer is normally present in the rubber composition in an amount of 50 parts or less, preferably 5 to 45 parts, and more preferably 20 to 40 parts by weight per 100 parts of the base rubber.

Particularly preferred base rubbers in compositions of the present invention are high Mooney polybutadienes. For purposes of the present invention, "high Mooney" refers to polybutadienes having a Mooney viscosity, as measured prior to oil or plasticizer addition, of 40 or greater. Preferred high Mooney polybutadienes of the present invention are neodymium-catalyzed, preferably having a cis content of 90% or greater, although low cis (<90%), trans, and vinyl versions are also suitable. Titanium-catalyzed, nickel-catalyzed, and cobalt-catalyzed high Mooney polybutadienes also are suitable.

Of the many possible nucleating agents that can be used in the rubber core material, it was found that benzenetrisamides provide a composition having the most desirable properties for a golf ball layer made in accordance with this invention, In general, the benzenetrisamides have the following generic structure:

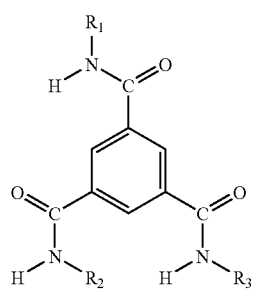

wherein $R_1$, $R_2$ and $R_3$ are identical and are cyclopropyl, cyclobutyl, cycloheptyl, 1-adamantyl, 3-methylcyclohexyl, 2,3-dimethylcyclohexyl, 3,3,5-trimethylcyclohexyl, S(+)-1-cyclohexylethyl, R(+)-1-cyclohexylethyl, isopropyl, 1,1-dimethylpropyl, 1,2-dimethylpropyl, 2-butyl, 3-methylbutyl or 1,1,3,3-tetramethylbutyl.

Methods for making the benzenetrisamides are known in the art and described in such references as Schmidt et al., U.S. Pat. Nos. 7,235,191 and 7,479,515, the disclosures of which are hereby incorporated by reference.

As discussed above, it is a difficult task to prepare a rubber composition containing a nucleating agent for use as a core layer in a golf ball. Adding a nucleating agent is difficult, because it tends to have both a positive and negative impact on the resulting rubber composition. Particularly, the nucleating agent makes the composition more rigid. The stiffness and hardness of the composition are increased. On one hand, this is advantageous, because when such a composition is used to form a core layer, the resiliency and COR of the golf ball may be improved. On the other hand, adding the nucleating agent may cause the rubber composition to become overly stiff and this is disadvantageous. If the core is too stiff, the resulting golf ball may have a hard "feel." With hard balls, the player senses less control when the club makes contact, and such balls feel less natural and comfortable. Moreover, if the ball is overly stiff, it is more difficult to control and place a spin thereon. Now, in accordance with the present invention, it has been found that the benzenetrisamides may be used to make a rubber composition that, in turn, can be used to form a core material having an optimum combination of properties. For purposes of this invention, the benzenetrisamides should be added in an amount of 0.1 to 5 parts by weight per 100 parts of the base rubber. While not wishing to be bound by any theory, it is believed that adding the nucleating agent in this amount to the semi-crystalline rubber composition enhances the growth of preferred crystal polymorphs. The crystallites may exist above or below room temperature, may be transient or permanent, or may be induced during a mechanical deformation such as strain induced crystallization. These polymorphs enhance the resilience, durability, and toughness of the composition without making the composition overly rigid. The resulting ball tends to have sufficient hardness so that it has good resiliency as well as, durability, toughness, and impact strength. At the same time, however, the ball tends to have sufficient softness so that it has a soft feel and good spin control.

The rubber composition is cured using a conventional curing process. Preferably, the cross-linked rubber composition is a thermoset rubber as opposed to a thermoplastic rubber such as an ethylene/propylene rubber, ethylene-propylene (EPDM) terpolymer or other modified polypropylene based-composition. In thermoplastic rubber compositions, the crystallization of the polypropylene segments causes cross-linking like behavior of the composition and this is reversible upon heating. Suitable curing processes include, for example, peroxide curing, sulfur curing, radiation, and combinations thereof. In one embodiment, the base rubber is peroxide cured. Organic peroxides suitable as free-radical initiators include, for example, dicumyl peroxide; n-butyl-4,4-di(t-butylperoxy)valerate; 1,1-di(t-butylperoxy)3,3,5-trimethylcyclohexane; 2,5-dimethyl-2,5-di(t-butylperoxy)hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Peroxide free-radical initiators are generally present in the rubber compositions in an amount within the range of 0.05 to 15 parts, preferably 0.1 to 10 parts, and more preferably 0.25 to 6 parts by weight per 100 parts of the base rubber. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Rockland React-Rite and Sartomer. When the cross-linking agent is zinc diacrylate and/or zinc dimethacrylate, the agent typically is included in the rubber composition in an amount within the range of 1 to 60 parts, preferably 5 to 50 parts, and more preferably 10 to 40 parts, by weight per 100 parts of the base rubber. When one or more less active cross-linking agents are used, such as zinc monomethacrylate and various liquid acrylates and methacrylates, the concentration of the less active cross-linking agent may be the same or higher as the more active cross-linking agent (zinc diacrylate and zinc dimethacrylate). A combination of a cross-linking agent such as zinc diacrylate and cross-linking co-agent such as trimethylolpropane trimethacrylate may be used.

Sulfur and sulfur-based curing agents with optional accelerators may be used in combination with or in replacement of the peroxide initiators to cross-link the base rubber. Suitable sulfur-based curing agents and accelerators include, for example, sulfur; N-oxydiethylene 2-benzothiazole sulfenamide; N,N-diorthotolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

High energy radiation sources capable of generating free-radicals may also be used to cross-link the base rubber. Suitable examples of such radiation sources include, for example, electron beams, ultra-violet radiation, gamma radiation, X-ray radiation, infrared radiation, heat, and combinations thereof.

Rubber compositions of the present invention may also contain "soft and fast" agents such as a halogenated organosulfur, organic disulfide, or inorganic disulfide compound. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95. ZnPCTP is commercially available from EchinaChem (San Francisco, Calif.). These compounds also may function as cis-to-trans catalysts to convert some cis-1,4 bonds in the polybutadiene to trans-1,4 bonds. Peroxide free-radical initiators are generally present in the rubber compositions in an amount within the range of 0.05 to 10 parts and preferably 0.1 to 5 parts.

The rubber compositions of the present invention preferably include fillers to adjust the density, specific gravity, and/or other properties of the core. Examples of useful fillers for adjusting the density and specific gravity include metal or metal alloy powders, metal oxides, and carbonaceous materials. These include, but are not limited to, bismuth powder, boron powder, brass powder, bronze powder, cobalt powder, copper powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include, but are not limited to, zinc oxide, iron oxide, aluminum oxide, titanium dioxide, magnesium oxide, zirconium oxide, and tungsten trioxide. Examples of particulate carbonaceous materials include, but are not limited to, graphite and carbon black. Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, regrind (which is recycled uncured center material mixed and ground to 30 mesh particle size), manganese powder, and magnesium powder. Other examples of useful fillers include polymeric, ceramic, metal, and glass microspheres.

Antioxidants also may be added to the rubber compositions of the invention. Antioxidants are compounds that prevent the breakdown of the elastomers. Suitable antioxidants include, but are not limited to, quinoline type antioxidants, amine type antioxidants, and phenolic type antioxidants. Other ingredients such as accelerators (for example, tetra methylthiuram), processing aids, processing oils, dyes and pigments, wetting agents, surfactants, plasticizers, as well as other additives known in the art may be added to the composition. Generally, the fillers and other additives are present in the rubber composition in an amount within the range of 1 to 70 parts by weight per 100 parts of the base rubber.

The core may be formed by mixing and forming the rubber composition using conventional techniques. For example, the core composition may be produced by forming a mixture comprising polybutadiene, zinc diacrylate, the nucleating agent, and filler. When a set of predetermined conditions is met, i.e., time and temperature of mixing, the free-radical initiator is added. In particular, as the components are mixed, the resultant shear causes the temperature of the mixture to rise. After completion of the mixing, the golf ball core composition is milled and hand prepped or extruded using a machine into pieces ("preps") suitable for molding. The milled preps are then compression molded into cores at an elevated temperature, typically 300° to 350° F. for 15 minutes at 2,500 lbs of pressure. These cores can be used to make finished golf balls by surrounding the core with outer core layer(s), intermediate layer(s), and/or cover materials.

Figure 4:
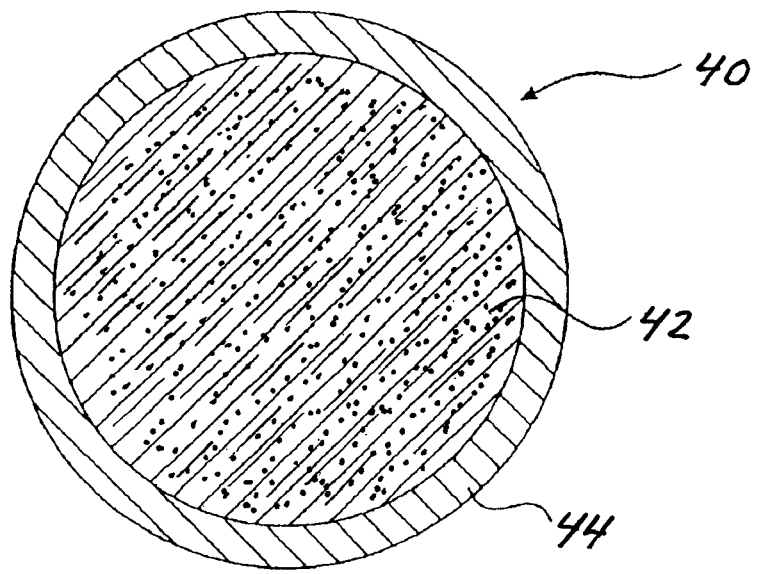
FIG. 4 is a cross-sectional view of a two-piece golf ball having a core made of a rubber composition in accordance with the present invention.
Figure 5:
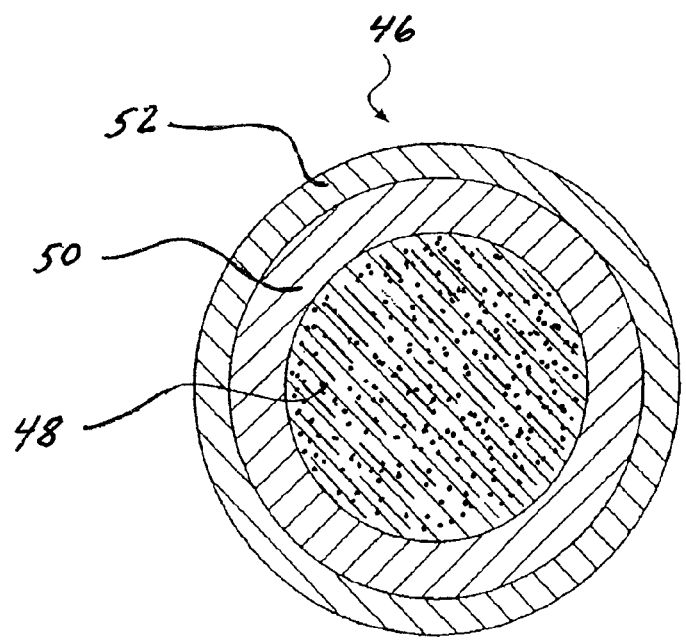
FIG. 5 is a cross-sectional view of a three-piece golf ball having a core made of a rubber composition in accordance with the present invention.
Figure 6:
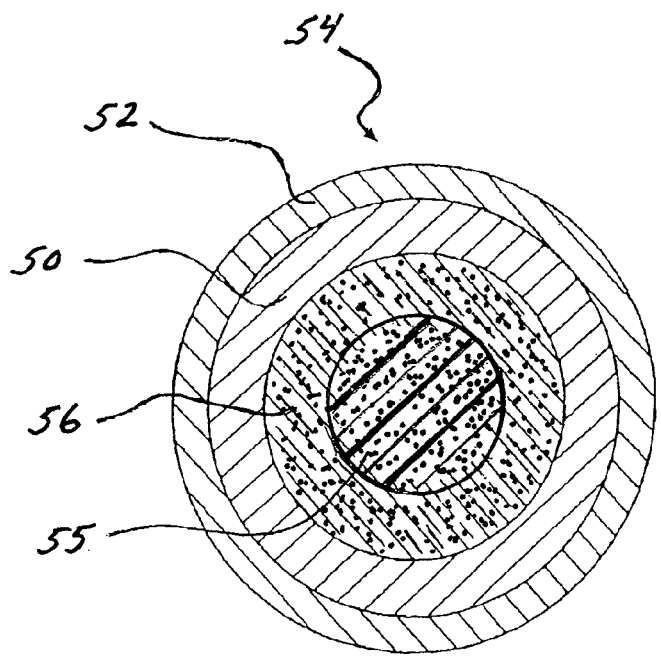
FIG. 6 is a cross-sectional view of a four-piece golf ball containing a two-piece core made of a rubber composition in accordance with the present invention.

Referring to FIG. 4, one embodiment of a golf ball that can be made in accordance with this invention is generally indicated at (40). The ball (40) includes an inner core (42) made of the rubber composition of this invention and outer cover (44) that may be made of a suitable material as discussed further below. Turning to FIG. 5, another embodiment of a suitable golf ball (46) is shown. The golf ball (46) preferably has a core (48), intermediate layer (50), and cover layer (52). The rubber composition of this invention, as discussed above, may be used to prepare the core (48). In yet another version, as shown in FIG. 6, the golf ball (54) includes an inner core (55) and surrounding outer core layer (56). This core structure may be referred to as a multi-layered core or two-piece core.

The inner core (55) may be made of a first rubber composition and the outer core layer (56), which surrounds the inner core (55), may be made of a second rubber composition. The rubber compositions used to make the inner core (55) and outer core layer (56), respectively, may be identical or different formulations. The intermediate layer (50) and outer cover (52) may be made of the below-described materials. As discussed above, each rubber composition comprises a base rubber and nucleating agent. In addition, the rubber composition normally includes a free-radical initiator agent, cross-linking coagent, and fillers.

As shown in FIGS. 5-6, each of the respective golf balls (46, 54) includes an intermediate layer (50) and outer cover (52). As used herein, the term, "intermediate layer" means a layer of the ball disposed between the core and cover. The intermediate layer may be considered an outer core layer, or inner cover layer, or any other layer disposed between the inner core and outer cover of the ball. The intermediate layer also may be referred to as a casing or mantle layer. It also should be understood that the ball may include one or more intermediate layers. The intermediate layer (50) may be made of any suitable material known in the art including thermoplastic and thermosetting materials. Suitable thermoplastic compositions for forming the intermediate layer include, but are not limited to, partially- and fully-neutralized ionomers, graft copolymers of ionomer and polyamide, and the following non-ionomeric polymers, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like: polyesters; polyamides; polyamide-ethers, and polyamide-esters; polyurethanes, polyureas, and polyurethane-polyurea hybrids; fluoropolymers; non-ionomeric acid polymers, such as E/Y- and E/X/Y-type copolymers, wherein E is an olefin (for example, ethylene), Y is a carboxylic acid, and X is a softening comonomer such as vinyl esters of aliphatic carboxylic acids, and alkyl alkylacrylates; metallocene-catalyzed polymers; polystyrenes; polypropylenes and polyethylenes; polyvinyl chlorides and grafted polyvinyl chlorides; polyvinyl acetates; polycarbonates including polycarbonate/acrylonitrile-butadiene-styrene blends, polycarbonate/polyurethane blends, and polycarbonate/polyester blends; polyvinyl alcohols; polyethers; polyimides, polyetherketones, polyamideimides; and mixtures of any two or more of the above thermoplastic polymers.

Examples of commercially available thermoplastics suitable for forming the intermediate layer include, but are not limited to: Pebax® thenmoplastic polyether block amides, commercially available from Arkema Inc.; Surlyn® ionomer resins, Hytrel® thenmoplastic polyester elastomers, and ionomeric materials sold under the trade names DuPont® HPF 1000 and HPF 2000, all of which are commercially available from E.I. du Pont de Nemours and Company; Iotek® ionomers, commercially available from ExxonMobil Chemical Company; Amplify® 10 ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

It is further recognized that the ionomeric resins may be blended with non-ionic thermoplastic resins. Examples of suitable non-ionic thermoplastic resins that can be used in such blends include, but are not limited to, polyurethane, poly-ether-ester, poly-amide-ether, polyether-urea, thermoplastic polyether block amides (e.g., Pebax® block copolymers, commercially available from Arkema Inc.), styrene-butadiene-styrene block copolymers, styrene(ethylene-butylene)-styrene block copolymers, polyamides, polyesters, polyolefins (for example, polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E.I. du Pont de Nemours and Company, functionalized polymers with epoxidation, elastomers (e.g., ethylene propylene diene monomer rubber, metallocene-catalyzed polyolefin) and ground powders of thermoset elastomers.

The cover layer (52) may be made of conventional thermoplastic or thermoset resins. Suitable resins that may be used to construct the cover (52) include, but are not limited to, ionomer resins (for example, Surlyn® ionomer resins and DuPont® HPF 1000 and HPF 2000, commercially available from E.I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from E.I. du Pont de Nemours and Company; polyurethane-based thermoplastic elastomers, such as Elastollan®, commercially available from BASF; synthetic or natural vulcanized rubber; and combinations thereof.

In one preferred embodiment, partially- or fully-neutralized ionomer resins are used to make the cover layer (52). As mentioned above, commercially available ionomer resins are known in the industry and include numerous resins sold under the trademarks, Surlyn® (DuPont) and Escor® and Iotek® (Exxon). These ionomer resins are available in various grades and are identified based on the type of base resin, molecular weight, type of metal ion, amount of acid, degree of neutralization, additives, and other properties.

In a second preferred embodiment, polymethanes, polyureas, and polyurethane/polyurea hybrids are used to form the cover layer (52). When used as cover layer materials, the polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Golf balls made in accordance with this invention can be of any size, although the USGA requires that golf ball used in competition have a diameter of at least 1.68 inches and a weight of no greater than 1.62 ounces. For play outside of USGA competition, the golf balls can have smaller diameters and be heavier. Preferably, the diameter of the golf ball is in the range of about 1.68 to about 1.80 inches. The core generally will have a diameter in the range of about 1.26 to about 1.60 inches. In one preferred version, the single-piece core has a diameter of about 1.57 inches. The rubber composition of this invention may be used to make a core having relatively high resiliency and COR that is not overly stiff or rigid and has a relatively low compression. Particularly, the COR values of the core may be in the range of about 0.60 to about 0.85, and preferably about 0.70 to about 0.80. The compression of the core may be in the range of about 60 to about 90 and more preferably in the range of about 70 to about 80. In general, core hardness is in the range of about 30 to about 70 Shore D and more preferably in the range of about 40 to about 60 Shore D. As shown in FIGS. 4-6, the core portions generally makes up a substantial portion of the ball, for example, the core may constitute at least 95% or greater of the ball structure.

In FIGS. 4 and 5, the respective cores (42, 48) are shown as single-piece structures made from a rubber composition. In other instances, a multi-piece core may be constructed; that is, there may be two or more core pieces or layers (55, 56) as shown in FIG. 6. In such balls having two-piece cores, the inner core (55) may have a diameter of about 0.75 to about 1.30 inches, more preferably 1.00 to 1.15 inches, and be relatively soft (that is, it may have a compression of less than about 30.) Meanwhile, the outer core layer (56) may have a thickness of about 0.20 to about 0.60 inches and be slightly harder (compression of about 30 or greater.) That is, the two-piece core or "center" of the ball, which constitutes the inner core (55) and outer core layer (56), may have a total diameter of about 1.50 to about 1.64 inches, more preferably 1.510 to 1.620 inches, and a compression of about 60 to about 90.

Referring to FIGS. 5 and 6, which show golf balls having an intermediate layer (50), the range of thicknesses for the intermediate layer can vary because different materials can be used. In general, however, the thickness of the intermediate layer (50) will be in the range of about 0.015 to about 0.120 inches and preferably about 0.020 to about 0.060 inches. Multiple intermediate layers may be disposed between the inner core and outer cover. Preferably, the overall diameter of the core and all intermediate layers is about 90 percent to about 98 percent of the overall diameter of the finished ball. The thickness of the cover (44) (FIG. 4) and (52) (FIGS. 5-6) may vary, but it is generally in the range of about 0.015 to about 0.090 inches, preferably about 0.020 to about 0.050 inches, and more preferably about 0.020 inches to about 0.035 inches.

The golf balls of this invention may contain layers having the same hardness or different hardness values. As discussed above, the core, which is made from the rubber composition of this invention, generally has a hardness is in the range of about 30 to about 70 Shore D and more preferably in the range of about 40 to about 60 Shore D. The hardness of the intermediate and cover layers may vary, but each layer typically has a hardness in the range of about 30 to about 75 Shore D. As discussed above, the core may be constructed so that it is softer than the intermediate layers. For example, the core may have a hardness in the range of about 40 to about 55 Shore D, and the intermediate layer may have a hardness in the range of about 60 to about 75 Shore D. Furthermore, in some instances, the outer cover layer is intended to be softer than the intermediate layer. Thus, if the intermediate layer has a hardness in the range of about 60 to about 75 Shore D, in one embodiment, the cover material may have a hardness of about 40 to about 55 Shore D. The test methods for measuring surface hardness and material hardness are described in further detail below.

The golf balls of this invention may be constructed using any suitable technique known in the art. These methods generally include compression molding, flip molding, injection molding, retractable pin injection molding, reaction injection molding (RIM), liquid injection molding (LIM), casting, vacuum forming, powder coating, flow coating, spin coating, dipping, spraying, and the like.

The rubber composition of this invention may be used with any type of ball construction known in the art. Such golf ball designs include, for example, single-piece, two-piece, three-piece, and four-piece designs. The core, intermediate (casing), and cover portions making up the golf ball each can be single or multi-layered depending upon the desired playing performance properties. As discussed above, in preferred embodiments, the rubber composition of this invention is used in a core. However, in other embodiments, the rubber composition may be used in an intermediate layer, and/or cover, which may be single or multi-layered. That is, the rubber composition may be used in any golf ball construction so long as at least one layer comprises a rubber composition prepared in accordance with this invention.

Test Methods

Hardness: The surface hardness of a golf ball layer (or other spherical surface such as a core) is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the object, care must be taken to ensure that the golf ball or component (for example, a core) is centered under the durometer indentor before a surface hardness reading is obtained. A calibrated digital durometer, capable of reading to 0.1 hardness units, is used for all hardness measurements and is set to take the maximum hardness reading. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

Compression: In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in *Compression by Any Other Name, Science and Golf IV, Proceedings of the World Scientific Congress of Golf* (Eric Thain ed., Routledge, 2002) ("J. Dalton").

Coefficient of Restitution (COR): In the present invention, COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculates as the ratio of the ball's outgoing transit time period to the ball's incoming transit time period ($COR=V_{out}/V_{in}=T_{in}/T_{out}$).

It is understood that the golf balls described and illustrated herein represent only presently preferred embodiments of the invention. It is appreciated by those skilled in the art that various changes and additions can be made to such golf balls without departing from the spirit and scope of this invention. It is intended that all such embodiments be covered by the appended claims.

We claim:

1. A solid golf ball, comprising a core and a cover, wherein the core is formed from a rubber composition comprising a base rubber and nucleating agent, the nucleating agent being present in the amount of 0.1 to 5 parts by weight per 100 parts of the base rubber and having the following structure:

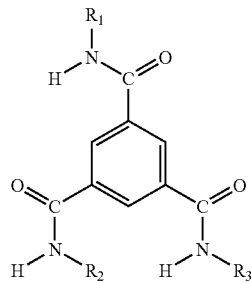

wherein $R_1$, $R_2$ and $R_3$ are identical and are cyclopropyl, cyclobutyl, cycloheptyl, 1-adamantyl, 3-methylcyclohexyl, 2,3-dimethylcyclohexyl, 3,3,5-trimethylcyclohexyl, S(+)-1-cyclohexylethyl, R(+)-1-cyclohexylethyl, isopropyl, 1,1-dimethylpropyl, 1,2-dimethylpropyl, 2-butyl, 3-methylbutyl or 1,1,3,3-tetramethylbutyl, the core having a COR value in the range of about 0.60 to about 0.85 and a compression in the range of about 60 to about 90.

2. The golf ball of claim 1, wherein the rubber composition comprises a base rubber selected from the group consisting of polybutadiene, polyisoprene, natural rubber, a copolymer of ethylene/propylene rubber, a copolymer of ethylene/propylene diene rubber, a copolymer of styrene/butadiene rubber, and mixtures thereof.

3. The golf ball of claim 1, wherein the base rubber is polybutadiene.

4. The golf ball of claim 1, wherein the composition further comprises a cross-linking agent selected from the group consisting of zinc acrylate, zinc diacrylate, zinc methacrylate, and zinc dimethacrylate, trimethylolpropane trimethacrylate, and mixtures thereof.

5. The golf ball of claim 1, wherein the composition further comprises a peroxide free-radical initiator.

6. The golf ball of claim 1, wherein the composition further comprises a sulfur-based curing agent.

7. The golf ball of claim 1, wherein the composition further comprises a halogenated organosulfur compound.

8. The golf ball of claim 7, wherein the halogenated organosulfur compound is zinc pentachlorothiophenol.

9. The golf ball of claim 1, wherein the core has a diameter in the range of about 1.26 to about 1.60 inches.

10. The golf ball of claim 1, wherein the cover has a thickness in the range of about 0.015 to about 0.090 inches.

11. The golf ball of claim 1, wherein an intermediate layer is disposed between the core and cover, the intermediate layer having a thickness in the range of about 0.015 to about 0.120 inches.

12. The golf ball of claim 1, wherein the core has a surface hardness in the range of about 30 to about 65 Shore D, and the cover has a material hardness in the range of about 30 to about 65 Shore D.

13. The golf ball of claim 11, wherein the intermediate layer has a material hardness in the range of about 30 to about 75 Shore D.

14. A solid golf ball, comprising an inner core and an outer core layer, the outer core layer encapsulating the inner core; an intermediate layer; and a cover, wherein the intermediate layer is disposed between the outer core layer and cover, the inner core and outer core layer each being formed from a rubber composition comprising a base rubber and nucleating agent, the nucleating agent being present in the amount of 0.1 to 5 parts by weight per 100 parts of the base rubber and having the following structure:

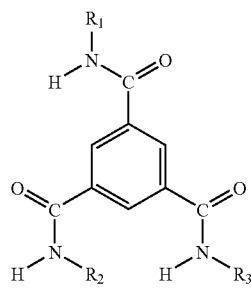

wherein $R_1$, $R_2$ and $R_3$ are identical and are cyclopropyl, cyclobutyl, cycloheptyl, 1-adamantyl, 3-methylcyclohexyl, 2,3-dimethylcyclohexyl, 3,3,5-trimethylcyclohexyl, S(+)-1-cyclohexylethyl, R(+)-1-cyclohexylethyl, isopropyl, 1,1-dimethylpropyl, 1,2-dimethylpropyl, 2-butyl, 3-methylbutyl or 1,1,3,3-tetramethylbutyl, the inner core and outer core layer, combined together, having a COR value in the range of about 0.60 to about 0.85 and a compression in the range of about 60 to about 90.

* * * * *